United States Patent
Li et al.

(10) Patent No.: US 10,524,109 B2
(45) Date of Patent: *Dec. 31, 2019

(54) METHOD AND APPARATUS FOR NETWORK-CONTROLLED PROXIMITY DEVICE TO DEVICE DISCOVERY AND COMMUNICATION

(71) Applicant: Nokia Technologies Oy, Espoo (FI)

(72) Inventors: Zexian Li, Espoo (FI); Mikko Uusitalo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/026,310

(22) Filed: Jul. 3, 2018

(65) Prior Publication Data

US 2018/0317080 A1     Nov. 1, 2018

Related U.S. Application Data

(63) Continuation of application No. 14/440,554, filed as application No. PCT/FI2012/051077 on Nov. 5, 2012, now Pat. No. 10,028,123.

(51) Int. Cl.
*H04W 8/00* (2009.01)
*H04W 76/14* (2018.01)
(Continued)

(52) U.S. Cl.
CPC ............. *H04W 8/005* (2013.01); *H04W 8/24* (2013.01); *H04W 76/11* (2018.02); *H04W 76/14* (2018.02); *H04W 84/042* (2013.01); *H04W 92/18* (2013.01)

(58) Field of Classification Search
None
See application file for complete search history.

(56) References Cited

U.S. PATENT DOCUMENTS

| 6,473,617 B1 | 10/2002 | Larsen et al. |
| 8,116,749 B2 | 2/2012 | Proctor, Jr. et al. |

(Continued)

FOREIGN PATENT DOCUMENTS

| CN | 1255261 A | 5/2000 |
| CN | 102265699 A | 11/2011 |

(Continued)

OTHER PUBLICATIONS

"3rd Generation Partnership Project; Technical Specification Group SA; Feasibility Study for Proximity Services (ProSe) (Release 12)", 3GPP TR 22.803, V0.5.0, Aug. 2012, pp. 1-34.

(Continued)

*Primary Examiner* — Kouroush Mohebbi
(74) *Attorney, Agent, or Firm* — Harrington & Smith (57) ABSTRACT

A method, apparatus and computer program in which an apparatus exchanges wirelessly information with a public land mobile network. The apparatus detects a wireless device to device discovery initiation instruction from the public land mobile network and responsively: sends one or more wireless discovery signal transmissions for a peer device or to monitor wireless discovery signal transmissions sent by a peer device; and directly communicates wirelessly with a peer device that indicates having received the wireless discovery signal transmission or from which the apparatus has detected a wireless discovery signal transmission in result of the monitoring of wireless discovery signal transmissions.

20 Claims, 4 Drawing Sheets

(51) Int. Cl.
*H04W 76/11* (2018.01)
*H04W 8/24* (2009.01)
*H04W 92/18* (2009.01)
*H04W 84/04* (2009.01)

(56) References Cited

U.S. PATENT DOCUMENTS

| | | | |
|---|---|---|---|
| 10,028,123 B2 * | 7/2018 | Li | H04W 8/005 |
| 2005/0096024 A1 | 5/2005 | Bicker et al. | |
| 2010/0165882 A1 | 7/2010 | Palanki et al. | |
| 2010/0167743 A1 | 7/2010 | Palanki et al. | |
| 2011/0268101 A1 | 11/2011 | Wang et al. | |
| 2012/0011247 A1 | 1/2012 | Mallik et al. | |
| 2013/0271350 A1 | 10/2013 | Lyons | |

FOREIGN PATENT DOCUMENTS

| | | | | |
|---|---|---|---|---|
| KR | 20120074255 | | 7/2012 | |
| WO | WO-2010006650 A1 * | 1/2010 | | H04W 72/02 |
| WO | WO-2010078271 A2 | | 7/2010 | |
| WO | WO-2010078281 A2 | | 7/2010 | |
| WO | WO-2010/137004 A1 | | 12/2010 | |
| WO | WO-2011/063845 A1 | | 6/2011 | |
| WO | WO-2012/035367 A1 | | 3/2012 | |
| WO | WO-2012089242 | | 7/2012 | |
| WO | WO-2012/110076 A1 | | 8/2012 | |
| WO | WO-2012/118311 A2 | | 9/2012 | |

OTHER PUBLICATIONS

"D2D Proximity-based Services Propel Digital Economy", MOEA COCID, Retrieved on Sep. 10, 2012, Webpage available at :http://www.communications.org.tw/communications/page.php?pg=detail&lang=eng&unit=2252&cone=3&ctwo=11.

"3rd Generation Partnership Project; Technical Specification Group SA; Feasibility Study for Proximity Services (ProSe) (Release 12)", 3GPP TR 22.803, V1.0.0, Aug. 2012, pp. 1-33.

"Terrestrial Trunked Radio (TETRA);Technical requirements for Direct Mode Operation (DMO);Part 10: Managed Direct Mode Operation (M-DMO)", ETSI TS 100 396-10, V1.1.1, Dec. 2000, pp. 1-39.

"TETRA—Direct Mode Operation", Terrestrial Trunked Radio, Retrieved on Aug. 2, 2016, Webpage available at : http://www.slideshare.net/zahidtg/tetra-direct-mode-operation.

Extended European Search Report received for corresponding European Patent Application No. 12887730.5, dated Jun. 23, 2016, 7 pages.

Fodor et al., "Design Aspects of Network Assisted Device-to-Device Communications", IEEE Communications Magazine, vol. 50, No. 3, Mar. 2012, pp. 170-177.

International Search Report and Written Opinion received for corresponding Patent Cooperation Treaty Application No. PCT/FI2012/051077 , dated Jul. 1, 2013, 11 pages.

Agrawal et al. "Issues in integrating cellular networks, wlans, and manets: a futuristic heterogeneous wireless network", IEEE Personal Communications, Jun. 1, 2005, p. 35.

* cited by examiner

METHOD AND APPARATUS FOR NETWORK-CONTROLLED PROXIMITY DEVICE TO DEVICE DISCOVERY AND COMMUNICATION

CROSS REFERENCE TO RELATED APPLICATION

This is a continuation patent application of U.S. patent application Ser. No. 14/440,554 filed on May 4, 2015, which is a National Stage Application of PCT/FI2012/051077 filed Nov. 5, 2012, which are hereby incorporated by reference in their entireties.

TECHNICAL FIELD

The present application generally relates to network-controlled proximity device to device discovery and communication.

BACKGROUND

Cellular networks operate within their coverage area so that radio signals are sent solely between each mobile telephone and one or more base stations. However, there are occasions in which one mobile telephone is out of coverage of the base stations. Emergency calls can yet be made through any operator so that network coverage can be found through another operator on calling to an emergency phone number.

SUMMARY

Various aspects of examples of the invention are set out in the claims.

According to a first example aspect of the present invention there is provided an apparatus comprising:
a wireless communication interface configured to exchange information with a public land mobile network; and
at least one processor configured to control operation of the apparatus;
wherein the at least one processor is configured to detect a device to device discovery initiation instruction from the public land mobile network and to responsively:
cause the wireless communication interface to send one or more discovery signal transmissions for a peer device or to monitor discovery signal transmissions sent by a peer device; and
to cause communicating directly, using the wireless communication interface, with a peer device that indicates having received the discovery signal transmission or from which the apparatus has detected a discovery signal transmission in result of the monitoring of discovery signal transmissions.

According to a second example aspect of the present invention there is provided a method comprising:
exchanging wirelessly by an apparatus information with a public land mobile network;
detecting by the apparatus a wireless device to device discovery initiation instruction from the public land mobile network and responsively:
send by the apparatus one or more wireless discovery signal transmissions for a peer device or to monitor wireless discovery signal transmissions sent by a peer device; and
to directly communicate wirelessly with a peer device that indicates having received the wireless discovery signal transmission or from which the apparatus has detected a wireless discovery signal transmission in result of the monitoring of wireless discovery signal transmissions.

According to a third example aspect of the present invention there is provided an apparatus comprising
a processor configured to cause the apparatus to:
exchange wirelessly information with a public land mobile network;
detect a wireless device to device discovery initiation instruction from the public land mobile network and responsively:
send one or more wireless discovery signal transmissions for a peer device or to monitor wireless discovery signal transmissions sent by a peer device; and
to directly communicate wirelessly with a peer device that indicates having received the wireless discovery signal transmission or from which the apparatus has detected a wireless discovery signal transmission in result of the monitoring of wireless discovery signal transmissions.

According to a fourth example aspect of the present invention there is provided an apparatus comprising:
at least one processor; and
at least one memory including computer program code;
the at least one memory and the computer program code configured to, with the at least one processor, cause the apparatus to perform at least the following:
exchange wirelessly information with a public land mobile network;
detect a wireless device to device discovery initiation instruction from the public land mobile network and responsively:
send one or more wireless discovery signal transmissions for a peer device or to monitor wireless discovery signal transmissions sent by a peer device; and
to directly communicate wirelessly with a peer device that indicates having received the wireless discovery signal transmission or from which the apparatus has detected a wireless discovery signal transmission in result of the monitoring of wireless discovery signal transmissions.

According to a fifth example aspect of the present invention there is provided a computer program comprising:
code for exchanging wirelessly information with a public land mobile network;
code for detecting a wireless device to device discovery initiation instruction from the public land mobile network and responsively:
sending one or more wireless discovery signal transmissions for a peer device or to monitor wireless discovery signal transmissions sent by a peer device; and
directly communicating wirelessly with a peer device that indicates having received the wireless discovery signal transmission or from which the apparatus has detected a wireless discovery signal transmission in result of the monitoring of wireless discovery signal transmissions.
when the computer program is run on a processor.

According to a sixth example aspect there is provided a computer readable memory medium comprising the computer program of the fifth example aspect.

The computer readable memory medium of the sixth example aspect, wherein the memory medium is a non-transitory memory medium.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

According to a seventh example aspect of the present invention there is provided a method comprising:

exchanging by an apparatus information with a public land mobile network using a first radio transceiver;

discovering a proximate peer device by the apparatus using a second radio transceiver operating with a radio system other than the public land mobile network and responsively requesting with the first radio transceiver from the public land mobile network for permission to provide the discovered peer device with an access to a cellular service through the apparatus;

detecting by the apparatus a wireless device to device communication permission from the public land mobile network and responsively:

starting to relay information between the public land mobile network and the peer device using the first and second radio transceivers, respectively.

According to an eighth example aspect of the present invention there is provided an apparatus comprising:

a memory comprising computer program code; and at least one processor configured to cause the apparatus to perform according to the program code the method of the seventh example aspect.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 6 of the drawings.

Figure 1:
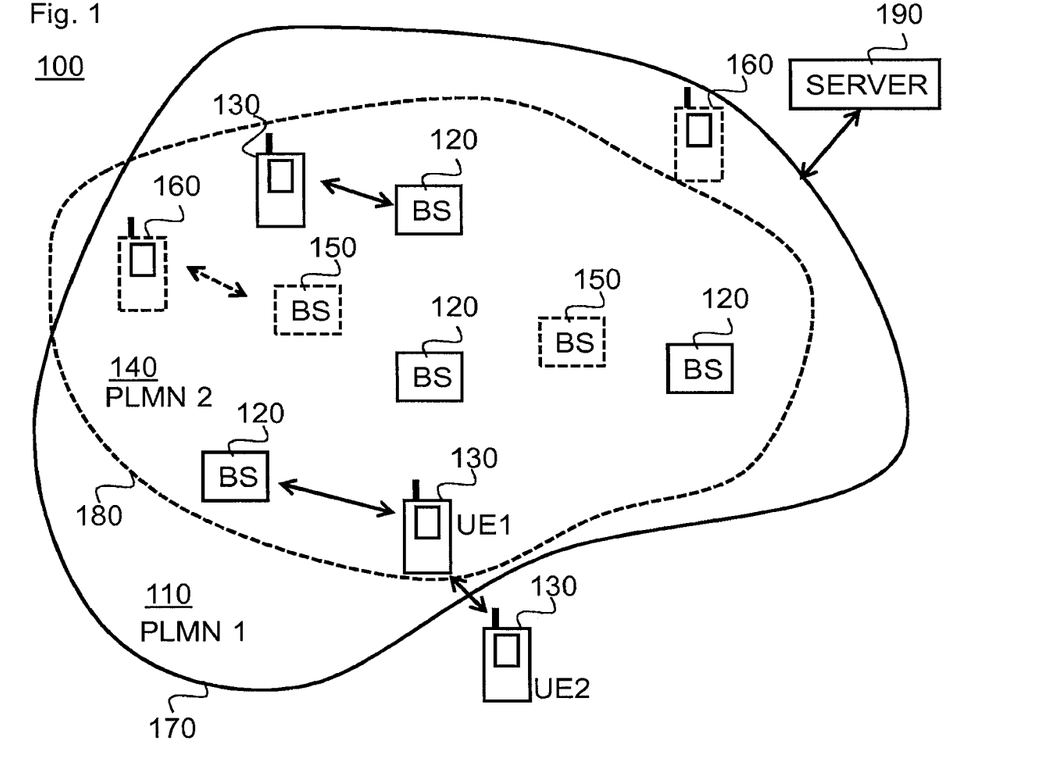
FIG. 1 shows an architectural overview of a system of an example embodiment of the invention.

FIG. 1 shows an architectural overview of a system 100 of an example embodiment of the invention. The system 100 comprises a first public land mobile network (PLMN) 110 that has a plurality of base stations 120 and wireless mobile communication devices or user equipment (UE) 130, two of which are labeled as a first user equipment or UE1 and as a second user equipment or UE2 in sake of simpler discussion of some functions. The system 100 also comprises a second PLMN 140 with respective base stations 150 and user equipment 160. The second PLMN 140 and associated other elements are drawn with dashed lines so that the elements that operate in or with the first PLMN 110 are easier to identify.

In an example embodiment, the PLMNs are any of Global System for Mobile communications; wideband code division multiple access (W-CDMA); Long Term Evolution (LTE) or 4G; Interim Standard 95; CDMA2000; Personal Digital Cellular, for example. The PLMN may support circuit switched connections, packet switched connections or both alternatingly and/or simultaneously. The first and second PLMNs 110, 140 need not be of same type. It is also understood that some or all of the user equipment 130 can be multi-mode devices capable to operate with many different types of PLMNs including those used by the first and second PLMN 110, 140. The network with which each user equipment works can be determined by a subscription e.g. as defined by a subscriber identity module of any known type.

FIG. 1 also shows an illustrative first coverage 170 for the first PLMN 110 and a second coverage 180 for the second PLMN 140. The first coverage 170 contains a first user equipment UE1 but not a second user equipment UE2 that is relatively near the first user equipment UE2. The coverage of each PLMN can be determined by the operators of respective PLMN e.g. using measurement data received from moving user equipment and location of the user equipment either as determined by the user equipment themselves or by the PLMN.

In FIG. 1, the first user equipment UE1 and the second user equipment UE2 are that near that a device to device (D2D) link could be formed between them, as will be described in the following. The devices communicating directly with one another or attempting to communicate directly with one another, i.e. without the communications travelling through a base station of the PLMN, can be referred to as peer devices or peer apparatuses.

FIG. 1 also shows a server 190 communicatively connected with the first PLMN 110 that is used in the following to describe some example embodiments.

Figure 2:
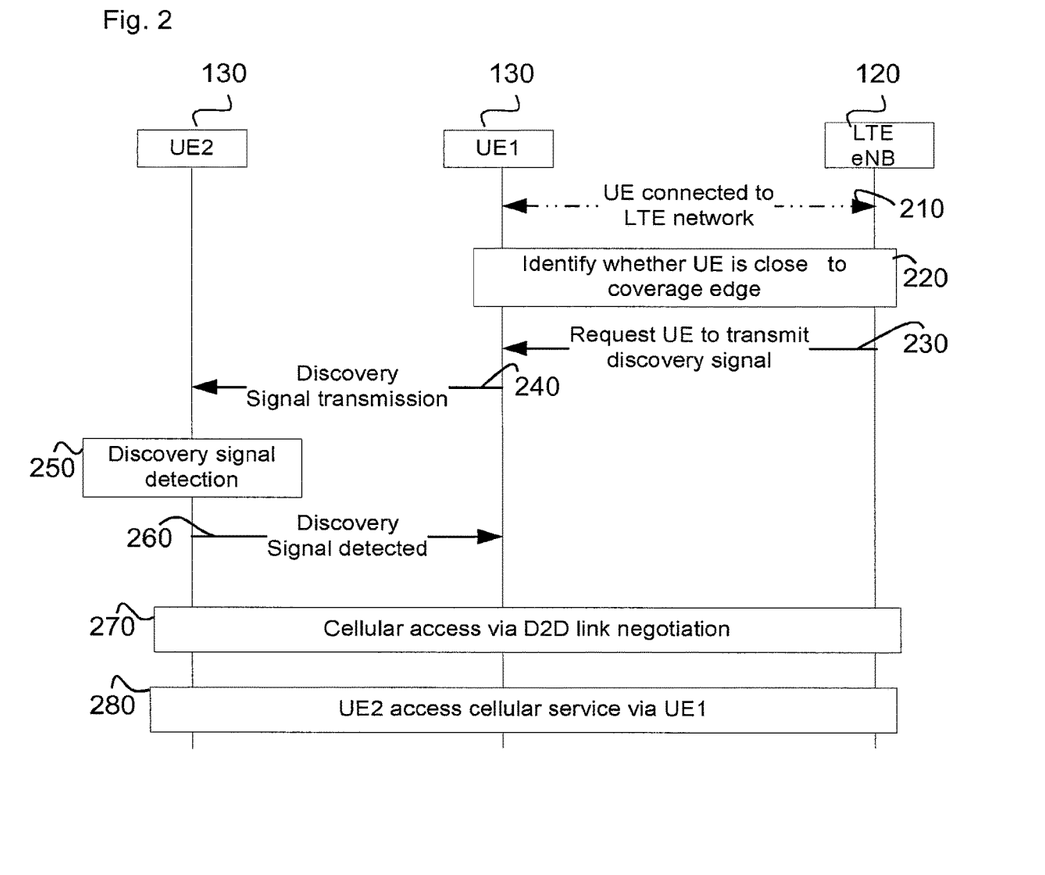
FIG. 2 shows a flow chart illustrating an example embodiment of the invention, using long term evolution as an example system.

FIG. 2 shows a flow chart illustrating an example embodiment of the invention, using LTE as an example system.

In beginning, the first user equipment UE1 is connected to the network, 210. It is then identified 220 whether the first user equipment UE1 is near an edge of the coverage edge (i.e. near first coverage 170 edge in FIG. 1). This step can be performed, depending on embodiment, by either or both of the first user equipment 130 and the network. Notice that while the signaling is drawn to end at the base station or eNB in terminology used in LTE, the related operations can be performed farther in the LTE network if not at the eNB itself. In sake of simplicity, the following description is made so that communications with the base station or eNB are equaled to communications with the network.

User equipment based identification of proximity to a coverage edge can be detected, for instance, by deducing from signal strengths of received pilot signals sent by base stations of the network, by comparing the location of the user equipment to known coverage area of the network, and/or by comparing current active set of base stations to a predefined set. The user equipment may comprise a positioning circuitry and/or receive position information from auxiliary devices and/or from the network.

Network based identification of proximity to a coverage edge can be detected, for instance, from the signal strength of uplink communications sent by the user equipment to the serving base station, possibly in combination with received signal strengths detected by other base stations in the network for signals originating from the user equipment. Instead of measuring signal strength, the commanded power level in itself can be used as a measure of signal attenuation and thus of distance. The network can also or alternatively be configured to perform network based positioning and to compare the location of the user equipment to known coverage area of the network.

The network 120 then requests the user equipment to start operating in a discovery mode. In FIG. 2, this discovery mode is such that the first user equipment UE1 sends one or more discovery advertisement or beacon signals indicating its presence for other user equipment such as the second user equipment UE2. Hence, the network 120 requests 230 the first user equipment UE1 to start transmitting the discovery signal(s) and responsively the first user equipment UE1 sends one or more discovery transmission signals.

The identification of user equipment close to coverage edge and requesting of user equipment to start operating in the discovery mode can be performed with signals specifically concerning given user equipment, i.e. one or more devices. In an alternative example embodiment, the network broadcasts or otherwise provides the user equipment with criteria that the user equipment then monitor(s) when operating. Once the criteria are met in given user equipment such as the first user equipment UE1, the user equipment in question starts operating in the discovery mode. In an example embodiment, this starting is also signaled to the network 120. Armed with this knowledge, the network 120 can change its operation so that no further user equipment are requested either directly or via defined criteria to start operating in the discovery mode in the proximity of the user equipment that is or are already so operating. In an example embodiment, the network selectively chooses which UEs are going to transmit beacon signals in certain area.

The second user equipment UE2 that is outside the coverage of the network 120 then detects 250 the discovery signal transmission from the first user equipment UE1. In response, the second user equipment UE2 sends a discovery signal detection message to the first user equipment UE1. The sending of this discovery signal detection message can indicate that the second user equipment UE2 desires to start a device to device link.

Cellular access via device to device link is next negotiated 270 (see FIG. 3), if the second user equipment UE2 has indicated a desire to do so by the discovery signal detected message. In an example embodiment, this discovery signal detected message contains a flag that enables the second user equipment UE2 to indicate if it desires to start the negotiation, if it does not desire to start the negotiation, or whether it desires or not to start the negotiation.

The discovery signal detected message can also be formed to contain an identifier of the second user equipment UE2. In an example embodiment, the first user equipment UE1 forwards that identifier to the network even if the second user equipment would not have indicated desire for starting the negotiation for cellular access via device to device communication. The network 120, being aware of an out-of-coverage device or the second user equipment UE2, can then instruct more frequent discovery processing using one or more user equipment (such as the first user equipment UE1) than if the network is not aware of any device being outside its coverage area. The network can also be configured, as in one example embodiment, to monitor deteriorating signals of user equipment and so determine if given user equipment leaves the network coverage. This information can likewise be used by the network to increase the frequency of device discovery processes by proximate other user equipment that remain within the network coverage.

After cellular access via device to device link has been negotiated 270, the second user equipment UE2 accesses 280 one or more cellular services via the first user equipment UE1.

Figure 3:
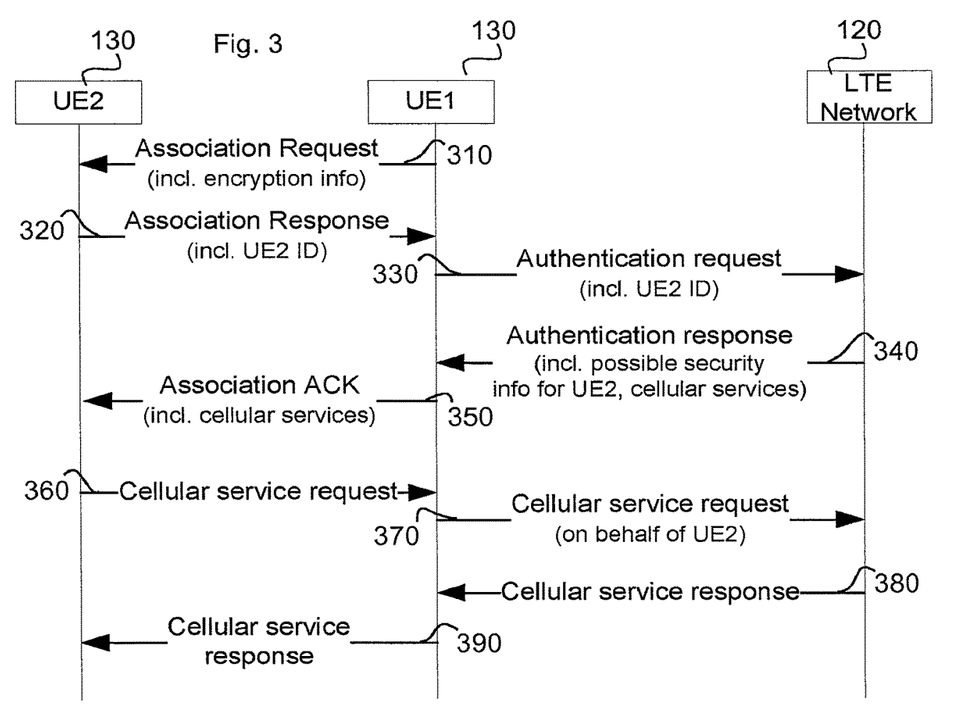
FIG. 3 shows a negotiation process according to one example embodiment.

Before turning to the negotiation 270 of the device to device link with reference to FIG. 3, some considerations are next discussed relating to the cellular access via device to device link of different user equipment (UE1, UE2).

Depending on the PLMN techniques in question, the user equipment is/are configured in any of different ways so that two different user equipment can communicate directly with one another. In time division duplex systems, this can be simply performed so that one user equipment transmits during a period that is normally reserved for downlink communications. In frequency division duplex systems, the transmitter can be configured to operate in the normal downlink frequency band or the receiver can be configured to operate in the normal uplink frequency band. Further still, the user equipment can be configured to operate in an auxiliary radio band not normally used for either of the uplink or downlink (e.g. using Private Mobile Radio (PMR) frequencies).

In the embodiments in which cellular communication channels are being used for device to device communications, the network can be configured to define parameters that the user equipment must use e.g. for avoiding of interference for the network and/or for other networks. The parameters contain in one example embodiment any one or more of: the frequency or frequencies to be used; a frequency hopping scheme; spreading code; scrambling code; time slot or time slots; allocation time; allocation period; link parameters such as modulation/coding scheme and data rate.

FIG. 3 shows the negotiation process 270 according to one example embodiment.

An association request is sent from the first user equipment UE1 to the second user equipment UE2, 310. The association request contains encryption information. In an example embodiment, where the second user equipment UE2 has identified itself in its discovery signal detection message, the first user equipment UE1 sends the identification to the network and receives corresponding authentication information for transmission to the second user equipment UE2. Such authentication information contains, for example, a challenge based on a shared secret of the network and of the second user equipment UE2 and/or other encryption information.

The second user equipment UE2 sends 320 to the first user equipment UE1 an association response. In this association response the UE2 can also send an authentication response to the network 120 in an example embodiment in which the first user equipment UE1 had already started authentication process for the second user equipment UE2. Alternatively, the first user equipment UE1 can send 330 to the network 120 an authentication request with identification of the second user equipment UE2 and receives 340 an authentication response with possible security information and information on cellular services for passing 350 to the second user equipment UE2.

Regardless how the second user equipment UE2 is authenticated to the network 120, the second user equipment UE2 finally has all the usual credentials for cellular service usage, based on the shared secret known by the second user equipment UE2 and the network 120. In this context, in sake of simplicity, the user equipment is assumed to contain also a possibly separately formed subscriber identification module such as a SIM or USIM card. Armed with these credentials, the second user equipment UE2 can subsequently send 360 a cellular service request for forwarding 370 by the first user equipment UE1 to the network 120. A cellular service response 380 is sent 380 by the network to the first user equipment UE1 that forwards 390 the cellular service response to the second user equipment 130.

The requesting cellular service and receiving response can be performed for a large number of times. For instance, if a telephone or video call is established, a great number of data packets can be sent back and forth over the first user equipment UE1. For reducing required signaling, the network 120 may define given slots or channels for relayed communications between the network 120 and the second user equipment UE2 over the first user equipment UE1. Then, the first user equipment UE1 will automatically forward any information received on these slots or channels.

Figure 4:
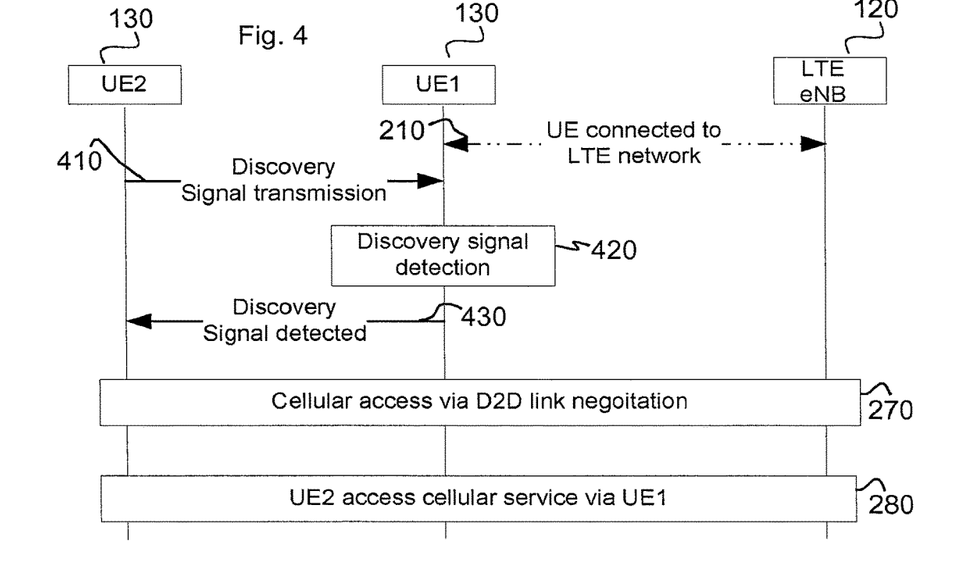
FIG. 4 shows a flow chart illustrating an example embodiment of the invention.

FIG. 4 shows a flow chart illustrating an example embodiment of the invention. In FIG. 4, the second user equipment UE2 sends 410 a discovery signal transmission. The first user equipment UE1 detects 420 the discovery signal and sends 430 to the second user equipment a discovery detected signal 430. The second user equipment can then negotiate 270 cellular access via device to device link and access 280 cellular service via the first user equipment UE1 as discussed in the foregoing with reference to FIG. 2.

While not drawn, in an example embodiment, the network 120 must first control the first user equipment to enable device to device discovery processing before the first user equipment starts to listen to discovery signal transmissions. The network 120 can also indicate particulars such as timing or other channel information indicative of possible discovery signal transmission opportunities given to user equipment that may broadcast discovery signal transmissions.

In an example embodiment, the network 120 also has to enable transmission of the discovery signal transmissions. In order to be able to convey such instructions to the user equipment, the network 120 can be configured to instruct each user equipment to enable discovery signal transmissions on detecting that such user equipment is about to leave the coverage area of the network 120. In another example embodiment, the user equipment can be provided with general enablement to transmit discovery signal transmissions if not able to receive signals from the network 120. Such general enablement can be used to prevent complete muting of user equipment that leaves the coverage too sudden for the network 120 to react by sending control instructions or that leaves the coverage when not operating (e.g. switched off by the user).

Instead of performing device discovery using cellular radio transmitters and receivers, the user equipment are configured in one example embodiment to use a second wireless communication circuitries, such as wireless local area network, Private Mobile Radio (PMR), WiMAX or IEEE 802.16 (e.g. IEEE 802.16m-2011), Nokia Instant Community (NIC) or Optical-Wireless (FiWi). In the Nokia Instant Community, for example, one can send a message spreading from device to device and then over more hops and it is possible to find devices needing help or able to help other devices for forming access to cellular services, for instance. In this case, the initial phase for NIC device to discovery each other is not controlled by the PLMN operators. Instead, the device to device discovery can be performed independently. The network can be informed of found peer device only if the found peer device needs access to cellular services. In case of optical communication, the network need not necessarily control the device to device communications for avoiding interference to the PLMN network itself. However, even then in an example embodiment, the network controls the device to device transmission permissions to avoid undue congestion.

The user equipment can be informed in various ways of the various details related to performing the device to device discovery and communication under control of the network. In one example embodiment, the data are stored beforehand on manufacture of the user equipment and/or on software updates. In another example embodiment, the user equipment periodically, on external triggering or on-demand retrieve the data e.g. from the server 190 shown in FIG. 1.

Selection of user equipment that operates as a bridge or mobile relay station for the out-of-coverage user equipment can be performed in a number of different ways. In one example embodiment, the discovery signal transmissions are configured to enable identification of their senders. For example, the discovery signal transmissions comprise an identification of the transmitting user equipment, a random code, session identifier, and/or the network controls the timing or channels used by each sending user equipment so that the receiving user equipment out of coverage can indicate in its response a given user equipment for use as a bridge for accessing the cellular service. The identification may comprise a device to device discovery identifier stored in a network server such as the server 190 with an associated identification of the user equipment or its subscription.

In an example embodiment, the user equipment are configured to detect e.g. from signal strength, signal to noise ratio, bit error rate or other quality indication which user equipment is best suited for bridging the out of coverage user equipment to access the cellular service. Pilot signals sent by the network can be the signals the strength or quality of which is to be estimated. Then the best suited user equipment is made to act as the bridge. By acting as a bridge or bridging in short reference is made to user equipment providing cellular access for assisted user equipment to the network via device to device communication. The assisted user equipment refers to the user equipment that gains access to cellular service via the bridging user equipment.

The user equipment is typically battery operated mobile, portable or handheld device. Operating as a bridge can cause substantially power and even deplete a battery. In an example embodiment, the user equipment is configured to signal its battery status (e.g. battery level and or charging state i.e. whether the battery is being charged) when instructed by the network to prepare or start device discovery processing. In another example embodiment, the user equipment can indicate its battery status to the network on meeting predetermined criteria or criterion such as approaching boundary of the coverage area; battery level exceeding a threshold level for sufficient battery level for bridging; battery level being below a threshold level for sufficient battery level for bridging; the user equipment being connected to a battery charger; the user of the user equipment having barred the bridging; the user of the user equipment having indicated desire to use the user equipment for the bridging.

The user equipment selection can also be subjected to available data rates of available user equipment. For instance, some user equipment may be capable of higher data rates than others and some user equipment may have ongoing data connections which leave little or no data transfer capacity.

The bridging user equipment and the out of coverage user equipment, such as UE1 and UE2 in FIG. 1, can be subscribing to same PLMN. Alternatively, they may be subscribing to different PLMNs. In an example embodiment, the network is charging a subscription of the assisted user equipment for the connections and/or data transferred. If the user equipment are subscribing to different PLMNs, the charging can be performed as if the assisted user equipment were normally roaming to the PLMN of the bridging user equipment. In an example embodiment, data rates available for connections of the assisted user equipment are provided as defined for the assisted user equipment. If greater than the maximum data rate of the bridging user equipment's subscription would enable, the PLMN of the bridging user equipment can allow increasing the data rate beyond the normal maximum to an extent possible and necessary for the assisted user equipment.

Privacy of the assisted user equipment can be protected in a number of ways. In an example embodiment, the communications between the assisted user equipment and the bridging user equipment are encrypted using the shared secret known by the network and the assisted user equipment. Thus, the assisting user equipment cannot decrypt these communications or display or present to its user. For power saving, these communications need not even be further encrypted as other information transferred between the bridging user equipment and the network.

The network controlled device discovery need not always lead into accessing cellular services by the assisted user equipment. In an example embodiment, the network controls when and how the user equipment can perform device discovery and device to device communication. Also in this case, the network can control the use of radio resource of the PLMN in question, if the user equipment communicate(s) using their cellular transmitters and receivers.

Network controlled device discovery may reduce power consumption, reduce radio interference and reduce adverse effects on maximum data throughput of user equipment by controlling only selected user equipment to broadcast or monitor device to device discovery signals. Other user equipment need(s) not broadcast or monitor the device to device discovery signals.

Figure 5:
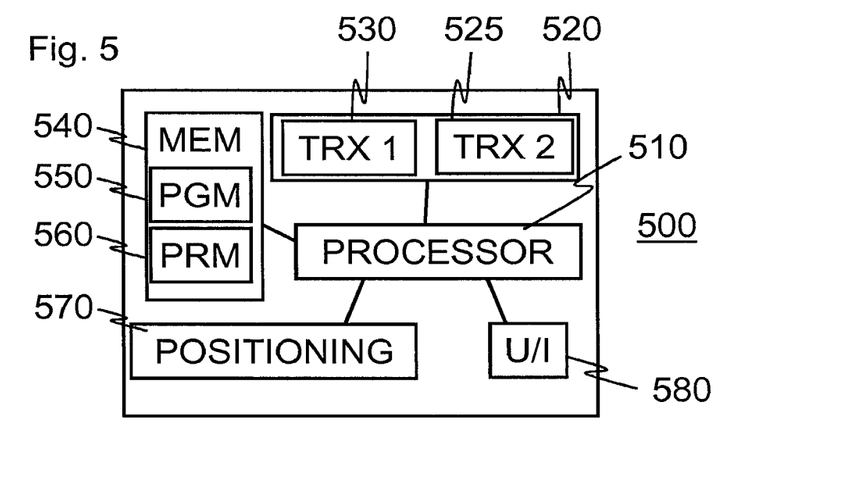
FIG. 5 shows a block diagram of an apparatus suited for operating as the user equipment in FIG. 1.

FIG. 5 shows a block diagram of an apparatus 500 suited for operating as the user equipment 130 or 160 of FIG. 1. In an example embodiment, the apparatus 500 is, comprises, or is comprised by one of the following: a mobile telephone; a laptop computer; a personal digital communication device; a game console; a navigation device; a vehicle navigation device; fixed cellular telecommunication device; a portable cellular telecommunication device; an electric book; and a tablet computer.

The apparatus 500 comprises some or all of the following functional elements: a processor 510; a wireless communication interface 520 comprising a first transmitter and receiver or transceiver 525 such as a PLMN compatible transceiver; a memory 540 comprising program code 550 and parameter data 560; a positioning circuitry 570; and a user interface 580. In an example embodiment, the wireless communication interface 520 further comprises a second transmitter and receiver or transceiver 530 such as a wireless local area network (WLAN); Private Mobile Radio (PMR); and/or WiMAX or IEEE 802.16 (e.g. IEEE 802.16m-2011) compatible transceiver. The second transmitter and receiver or transceiver 530 can be used e.g. for device to device discovery and/or communication using a radio system other than the PLMN and/or for other communications. The processor 510 can be configured to control general operations of the apparatus 500 according to the program code 550 and the parameter data 560. In addition to any of the aforementioned elements, the apparatus 500 can comprise other functional elements such as a power supply and chassis.

In one example embodiment, the parameter data 560 contains a device to device identifier. The device to device identifier may at simplest be a subscriber number, International Mobile Subscriber Identity (IMSI), Temporary International Mobile Subscriber Identity (TIMSI), Globally Unique Temporary UE Identity (GUTI). Alternatively, a particular device to device identifier or D2D identifier in short can be assigned for the purpose of device to device discovery and addressing of device to device messages. The D2D identifier can be defined by the user each user equipment, by the user equipment or by a network element. The D2D identifier need not necessarily be globally unique. However, for avoiding ambiguity and potential errors in addressing and for simplifying authentication to the PLMN, an example embodiment makes use of a D2D identity database accessible to the PLMN operator of the user equipment subscriptions in question. For instance, the server 190 can be configured to store the D2D identity database.

In an example embodiment, the D2D identity database comprises for each of a plurality of user equipment a D2D identifier with an associated globally unique identifier of subscriber e.g. in form of subscriber number or IMSI. Alternatively, the associated identifier can be a device identifier of the user equipment, such as an International Mobile Equipment Identity (IMEI). By making available to the PLMN the associated subscription identification, the PLMN can identify an assisted user equipment from its D2D identifier on receiving the D2D identifier e.g. as part of the process illustrated with reference to any of FIGS. 2 to 4.

Figure 6:
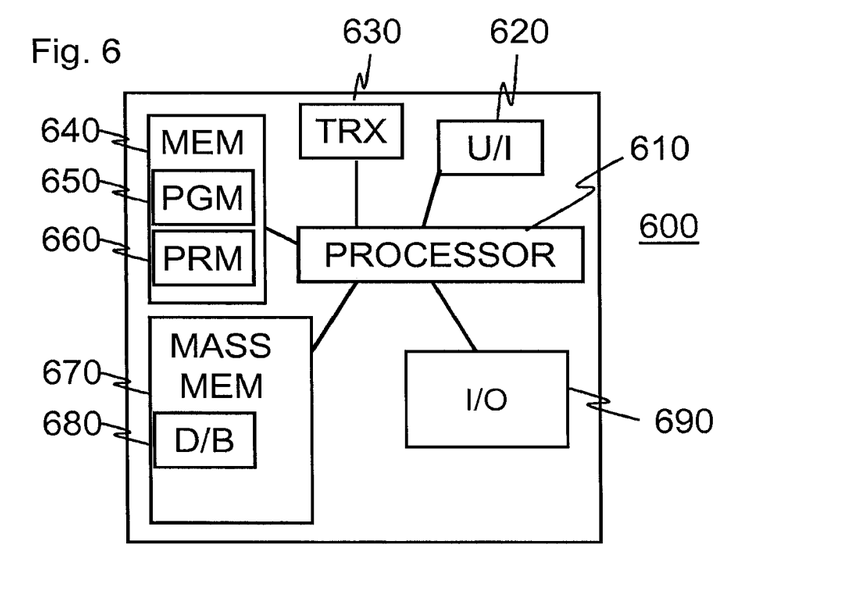
FIG. 6 shows a block diagram of an apparatus suited for operating as a network element such as base station or base station controller.

FIG. 6 shows a block diagram of an apparatus 600 suited for operating as a network element such as base station or base station controller. It shall be appreciated that the apparatus can be formed of discrete elements some of which reside at other sites and in remote device or devices.

The apparatus 600 comprises some or all of the following functional elements: a processor 610; a user interface 620; a transmitter and receiver or transceiver 630; a memory 640 comprising program code 650 and parameter data 660; and a mass memory 670 with a database 680 comprising e.g. measurement data, information on currently operating bridging user equipment, available devices for acting as bridging user equipment and coverage information of the network. The processor can be configured to control general operations of the apparatus 600 according to the program code 650 and the parameter data 660. The apparatus 600 further comprises an input/output circuitry 690 for communicating with other network elements. In addition to any of the aforementioned elements, the apparatus 600 can comprise other functional elements such as a power supply and chassis.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with examples of a computer described and depicted in FIGS. 5 and 6. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. A wireless communication device comprising:
at least one processor;
memory storing a program of instructions;
wherein the memory storing the program of instructions is configured, with the at least one processor, to cause the wireless communication device to at least:
in response to detection of a device to device discovery initiation instruction from a public land mobile network, initiate a search for a peer device available for device to device communication, wherein initiating the search for a peer device comprises:
sending at least one discovery signal transmission for reception by a peer device, wherein the at least one discovery signal transmission includes information indicating the presence of the wireless communication device and its availability for device to device communication, and wherein the at least one discovery signal transmission is transmitted by the wireless communication device in response to detection of the device to device discovery initiation instruction;
receiving from the peer device a response transmission indicating having received the at least one discovery signal transmission; and
establishing a relay connection between the peer device and the public land mobile network through the wireless communication device.

2. The wireless communication device of claim 1, wherein the wireless communication device sends measurement information to the public land mobile network.

3. The wireless communication device of claim 2, wherein the wireless communication device further comprises a battery for operating the wireless communication device and the measurement information comprises a battery status.

4. The wireless communication device of claim 1, wherein the wireless communication device is further caused to detect a discovery mode request from the public land mobile network to start operating in a discovery mode.

5. The wireless communication device of claim 4, wherein detection of the discovery mode request is contingent on identifying an identifier of the wireless communication device or associated subscription in the discovery mode request.

6. The wireless communication device of claim 4, wherein the detecting of the discovery mode request is contingent on validating that one or more specified criteria are met.

7. The wireless communication device of claim 6, wherein the validation of the one or more specified criteria comprises verifying that the discovery mode request the meets the one or more specified criteria.

8. The wireless communication device of claim 6, wherein the one or more specified criteria define a geographic region or a signal strength threshold for given downlink signals.

9. The wireless communication device of claim 4, wherein the wireless communication device sends one or more discovery advertisement signals in response to the detecting of the discovery mode request.

10. The wireless communication device of claim 9 wherein a device to device discovery identifier of the wireless communication device is included in the one or more discovery advertisement signals.

11. The wireless communication device of claim 4, wherein the wireless communication device begins listening for discovery advertisement signals in response to the detecting of the discovery mode request.

12. The wireless communication device of claim 1, wherein the wireless communication device connects with an assisted device discovered while in the discovery mode.

13. The wireless communication device of claim 12, wherein the negotiation comprises exchanging an authentication request and response between the wireless communication device and the assisted device.

14. The wireless communication device of claim 12, wherein the wireless communication device comprises exchanging authentication signaling between the assisted device and the public land mobile network for allowing the assisted device to authenticate to the public land mobile network.

15. A method comprising:
wirelessly exchanging, by a wireless communication device, information with a public land mobile network;
in response to detection of a wireless device to device discovery initiation instruction from the public land mobile network, initiating a search for a peer device available for device to device communication, wherein initiating the search for a peer device comprises:
sending at least one wireless discovery signal transmission for reception by a peer device,
wherein the at least one wireless discovery signal transmission includes information indicating the presence of the wireless communication device and its availability for device to device communication, and wherein the at least one wireless discovery signal transmission is transmitted by the wireless communication device in response to detection of the device to device discovery initiation instruction;
receiving from the peer device a response transmission indicating having received the at least one wireless discovery signal transmission; and
establishing a relay connection between the peer device and the public land mobile network through the wireless communication device.

16. The method of claim 15, further comprising wirelessly sending measurement information to the public land mobile network.

17. The method of claim 16, wherein the method is carried out by an apparatus and wherein the apparatus further comprises a battery for operating the apparatus and the measurement information comprises a battery status.

18. The method of claim 15, further comprising detecting a discovery mode request from the public land mobile network to start operating in a discovery mode.

19. The method of claim 18, further comprising subjecting the detecting of the discovery mode request to identifying of an identifier of the apparatus or associated subscription in the discovery mode request.

20. A non-transitory computer-readable medium storing a program of instructions, execution of which by at least one processor configures an apparatus to at least:

in response to detection of a device to device discovery initiation instruction from a public land mobile network, initiate a search for a peer device available for device to device communication, wherein initiating the search for a peer device comprises:

sending at least one discovery signal transmissions transmission for reception by a peer device, wherein the at least one discovery signal transmission includes information indicating the presence of the apparatus and its availability for device to device communication, and wherein the at least one discovery signal transmission is transmitted by the apparatus in response to detection of the device to device discovery initiation instruction; and receiving from the peer device a response transmission indicating having received the at least one discovery signal transmission; and establishing a relay connection between the peer device and the public land mobile network through the wireless communication device.

\* \* \* \* \*